US010552184B2

(12) United States Patent
Becht et al.

(10) Patent No.: US 10,552,184 B2
(45) Date of Patent: *Feb. 4, 2020

(54) ARRAY CLOCKING IN EMULATION

(71) Applicant: INTERNATIONAL BUSINESS MACHINES CORPORATION, Armonk, NY (US)

(72) Inventors: Michael J. Becht, Poughkeepsie, NY (US); Raymond Wong, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/440,405

(22) Filed: Feb. 23, 2017

(65) Prior Publication Data
US 2018/0136690 A1 May 17, 2018

Related U.S. Application Data

(63) Continuation of application No. 15/352,824, filed on Nov. 16, 2016.

(51) Int. Cl.
G06F 1/08 (2006.01)
G06F 9/455 (2018.01)
G06F 17/50 (2006.01)

(52) U.S. Cl.
CPC ............ G06F 9/45508 (2013.01); G06F 1/08 (2013.01); G06F 17/5027 (2013.01); G06F 17/5054 (2013.01)

(58) Field of Classification Search
None
See application file for complete search history.

(56) References Cited

U.S. PATENT DOCUMENTS 7,003,746 B2 * 2/2006 Hyduke ............... G06F 17/5027
703/13
2014/0362651 A1 * 12/2014 Chang .................. G11C 7/1066
365/189.14
2015/0365740 A1 * 12/2015 Shinohara .......... H04Q 11/0005
398/52

(Continued)

OTHER PUBLICATIONS

List of IBM Patents or Patent Applicatins Treated as Related; Date Filed; Feb. 23, 2017, p. 1-2.

(Continued)

Primary Examiner — Tanh Q Nguyen
(74) Attorney, Agent, or Firm — Cantor Colburn LLP; Steven Chiu

(57) ABSTRACT

Examples of techniques for emulating an application-specific integrated circuit (ASIC) array using a field programmable gate array (FPGA) are disclosed. In one example implementation according to aspects of the present disclosure, a method may include loading configuration information to the FPGA, wherein the configuration information is representative of configuration information of the ASIC. The method may further include emulating the ASIC using the FPGA loaded with the configuration information by applying a fast emulation clock signal to the FPGA. The fast emulation clock signal is a multiple of a system clock signal.

4 Claims, 5 Drawing Sheets

(56) References Cited

U.S. PATENT DOCUMENTS

2016/0012107 A1* 1/2016 Asaad ............... G06F 17/30442
707/764
2018/0136689 A1* 5/2018 Becht ........................ G06F 1/08

OTHER PUBLICATIONS

Michael J. Becht, et al., "Array Clocking in Emulation", U.S. Appl. No. 15/352,824, filed Nov. 16, 2016.
V.P. Sampath, "FPGA Prototyping Techniques", Electronics for you, Dec. 1, 2015, p. 1-7.
List of IBM Patents or Patent Applications Treated as Related; POU920160337US2, dated: Feb. 23, 2017, pp. 1-2.
Michael J. Becht, et al.,"Array Clocking in Emulation", U.S. Appl. No. 16/581,932, dated: Sep. 25, 2019.

* cited by examiner

ARRAY CLOCKING IN EMULATION

DOMESTIC PRIORITY

This application is a continuation of U.S. patent application Ser. No. 15/352,824, entitled "ARRAY CLOCKING IN EMULATION," filed Nov. 16, 2016, the disclosure of which is incorporated by reference herein in its entirety.

BACKGROUND

The present disclosure generally relates to emulation and, more particularly, relates to array clocking in emulation.

Computer processing systems may utilize an application-specific integrated circuit (ASIC) for a particular use. For example, an ASIC may be used to process a particular type of transmission protocol and can be used in a wide range of applications. In some examples, an ASIC can be pre-manufactured for a special application while in other examples an ASIC can be custom manufactured for a particular customer application.

SUMMARY

According to examples of the present disclosure, techniques including methods, systems, and/or computer program products for emulating an application-specific integrated circuit (ASIC) array using a field programmable gate array (FPGA) are provided. An example method may include loading configuration information to the FPGA, wherein the configuration information is representative of configuration information of the ASIC. The method may further include emulating the ASIC using the FPGA loaded with the configuration information by applying a fast emulation clock signal to the FPGA. The fast emulation clock signal is a multiple of a system clock signal.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

A designer may design an application-specific integrated circuit (ASIC) for a particular use. However, testing an ASIC can be time consuming and costly. For example, it may take weeks or months for a vendor to manufacture and deliver an ASIC. This delay lengthens product release dates because the ASIC cannot be tested until it is delivered. In order to test products prior to ASIC delivery, field programmable gate arrays (FPGAs) may be used to emulate ASICs.

ASICs have numerous arrays (i.e., memory block), each of which may have a different type (e.g., register arrays, SRAM arrays, EDRAM arrays, etc.) or capability. Examples of different capabilities include frequency, different bit-writes associated with the data, read/write schemes, etc. In order to emulate a design, one would need to create FPGA equivalent designs for each of these arrays, which would result in a large number of array file types and much manual effort.

To address this problem, the present disclosure provides techniques for modeling ASIC arrays using FPGAs to match any frequency. To do this, the ASIC design is loaded to an FPGA emulator and a fast emulation clock signal is applied to the FPGA and a staging buffer to enable the various capabilities of the ASIC array on the FPGA. This enables testing ASIC design without a physical ASIC, which saves time and money during the design phase. The fast emulation clock enables testing any array type using the FPGA.

By testing the ASIC earlier in the product design phase, the product may be more thoroughly tested and/or tested earlier than would be otherwise possible. This enables product designer so detect and solve additional problems that may not otherwise be detectable until the physical ASIC is available.

Figure 1:
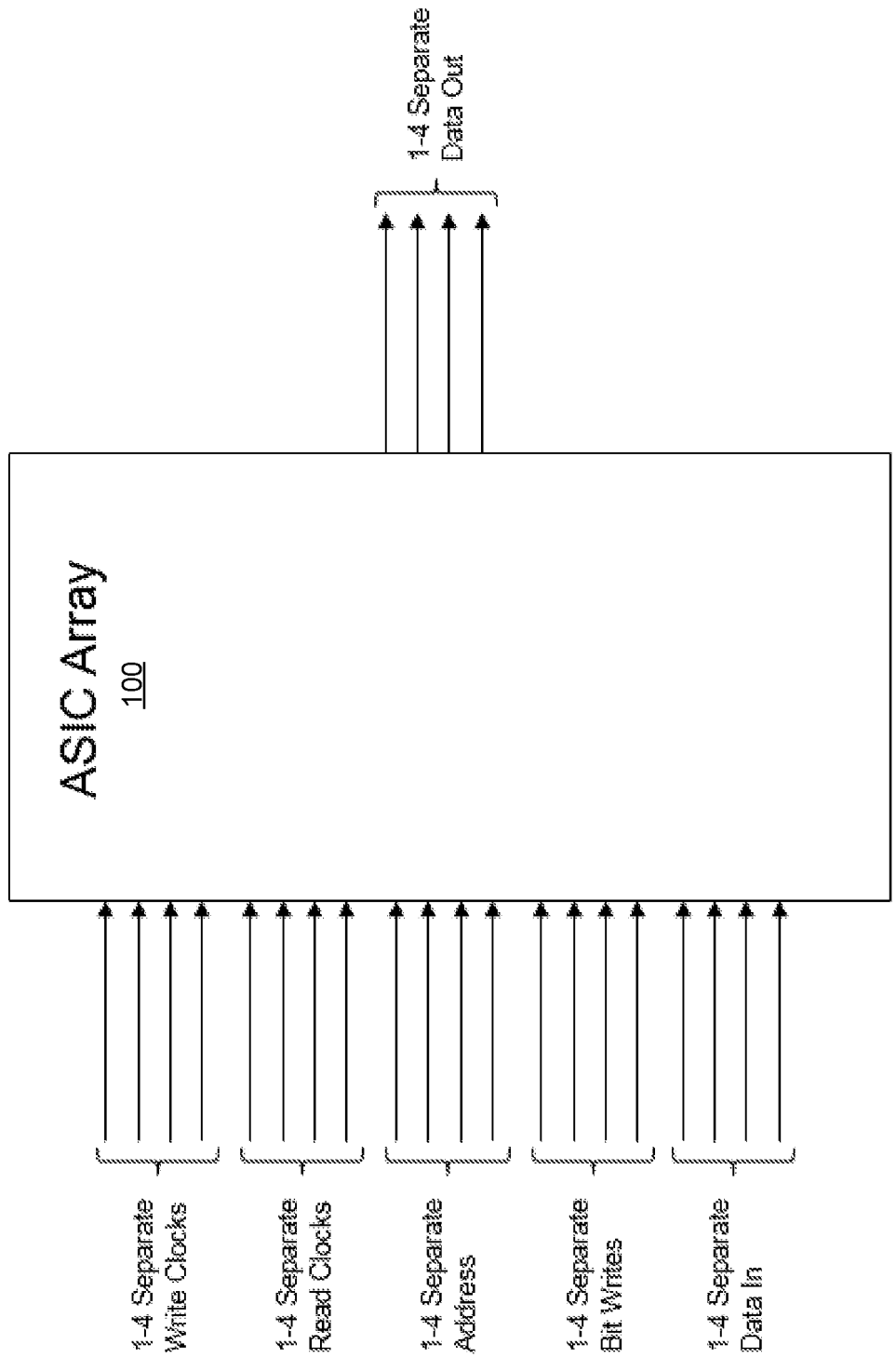
FIG. 1 illustrates an ASIC array to be emulated with an FPGA emulator according to aspects of the present disclosure.

FIG. 1 illustrates an ASIC array 100 to be emulated with an FPGA emulator according to aspects of the present disclosure. The ASIC array 100 can receive one or more separate input streams. For example, the ASIC array 100 may receive up to four separate input streams, which may be of the type: system clock signal, address signal, bit-writes signal, data in signal, and read/write signal. Based on these received signals, the ASIC array 100 outputs one or more data streams. For example, if the ASIC array 100 receives four separate input streams, the ASIC array 100 outputs four data streams.

Figure 2:
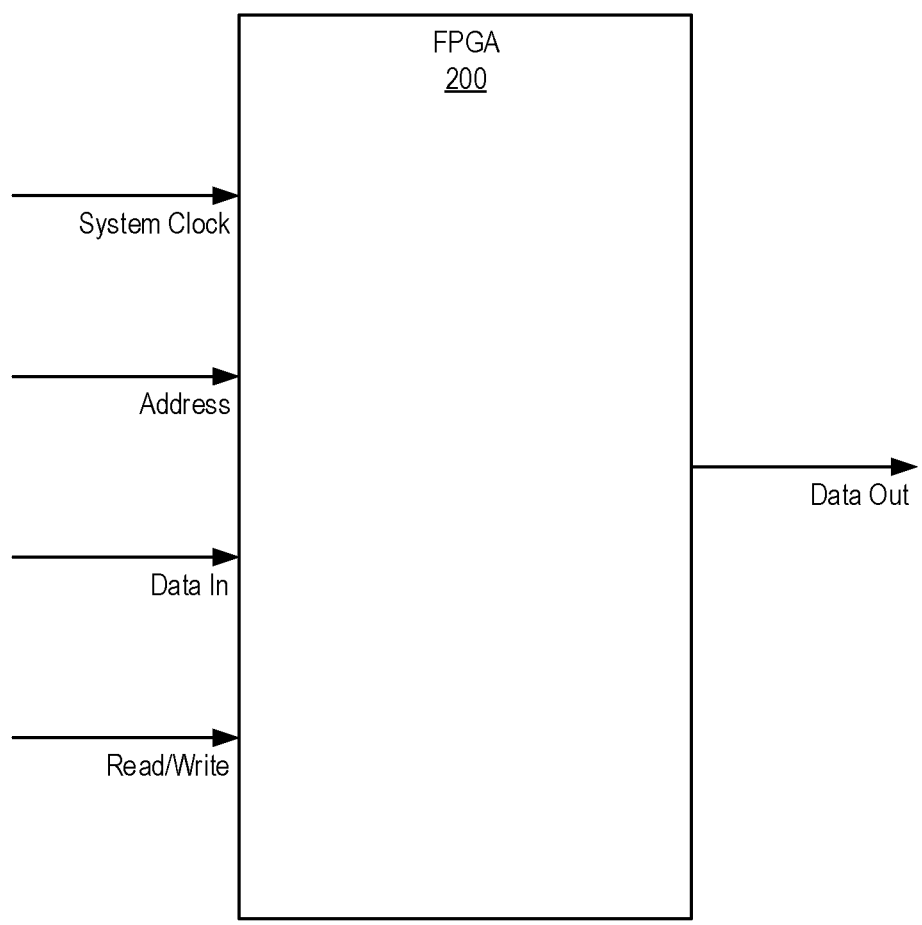
FIG. 2 illustrates an FPGA used to emulate an ASIC array according to aspects of the present disclosure.

FIG. 2 illustrates an FPGA 200 used to emulate an ASIC array according to aspects of the present disclosure. The FPGA 200 receives as input a system clock signal, an address signal, a data in signal, and a read/write signal. Based on these received signals, the FPGA 200 outputs data.

Because of the differences between the ASIC array 100 and the FPGA 200, it can be difficult to test an ASIC design using an FPGA. For example, differences in frequency, differences in bit-writes associated with data, read/write schemes, etc. can be different between an ASIC design and an FPGA.

Figure 3:
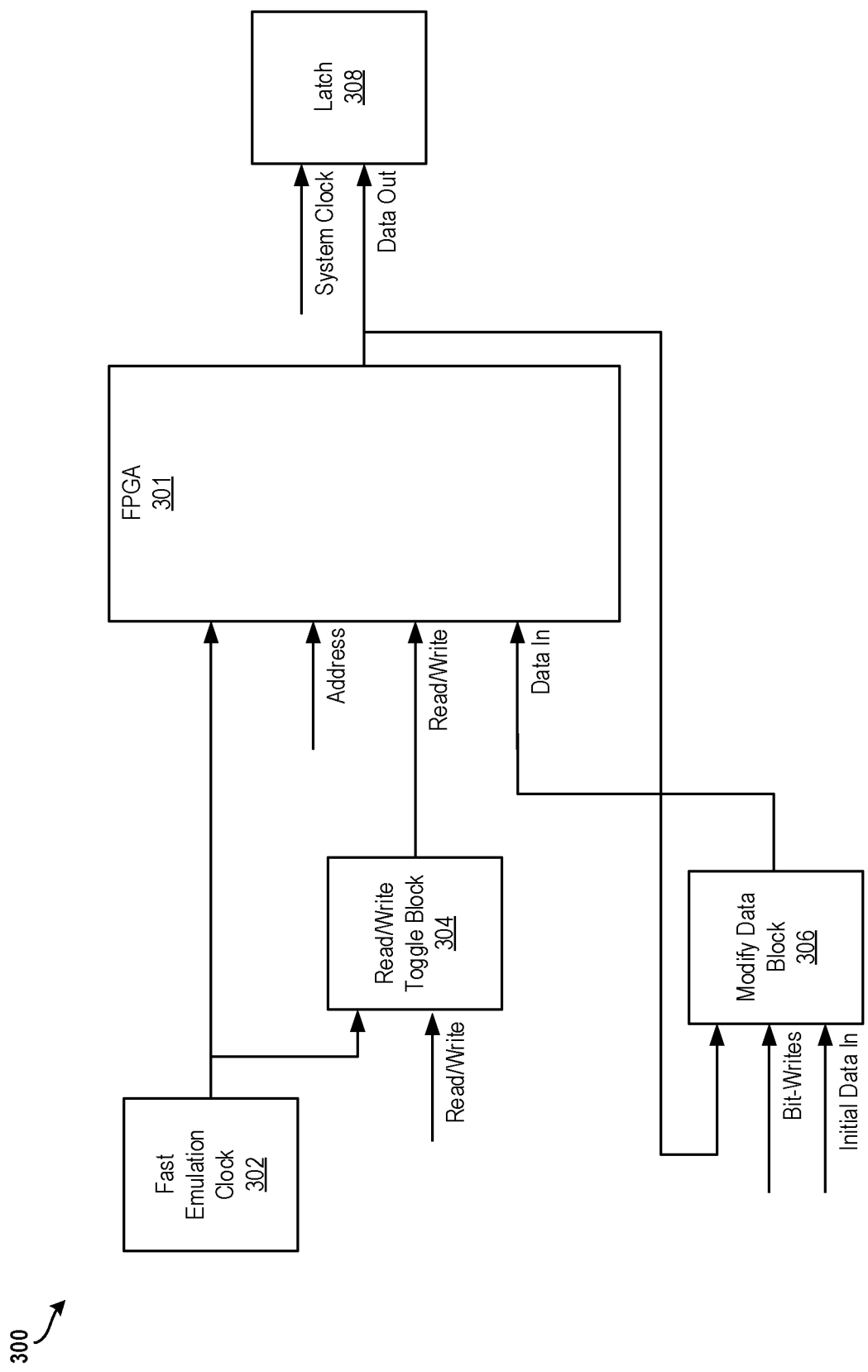
FIG. 3 illustrates an FPGA emulator for emulating an ASIC array according to aspects of the present disclosure.

To expedite testing of an ASIC, an FPGA emulator is provided so that the ASIC can be emulated. In particular, FIG. 3 illustrates an FPGA emulator 300 for emulating an ASIC array according to aspects of the present disclosure. This enables a product designer to merge the ASIC into the product design earlier in the testing cycle. In particular, the present disclosure provides for emulation of a real hardware device (e.g., an ASIC). To do this, all code from the product that the ASIC is going to be in is loaded to an FPGA. This may require many changes of gate types, one of the biggest of which is array types. To manually change each array type would be time consuming because each array type is unique.

Because FPGA emulators run at a slower clock speed than an ASIC, a single array file can be created that uses a "fast"

array clock signal and a staging buffer which enables the various capabilities of an ASIC array to be emulated using the FPGA.

The FPGA 301 receives a fast emulation clock signal from the fast emulation clock 302 instead of a system clock signal (as illustrated in FIG. 2). The fast emulation clock enables multiple read/write cycles during one system clock cycle. The fast emulation clock may be, for example, 8 to 10 times faster than the system clock, although other multipliers may be implemented. It should be appreciated that the fast emulation clock is a multiple speed of the original clock. It should also be appreciated that the frequency of the fast emulation clock 302 may be changed based on the type of ASIC array that is being emulated on the FPGA 301.

The read/write toggle block 304 also receives the fast emulation clock signal from the fast emulation clock 302 as well as a read/write signal. The read/write toggle block 304 toggles the read/write signal based on the fast emulation clock signal whether a read or write is occurring. The Read/write toggle block 304 then provides a read/write signal input (i.e., a read signal for a read operation or a write signal for a write operation) to the FPGA 300 based on the timing of the fast emulation clock signal. By using the fast emulation clock 302, multiple reads and writes may occur during one clock cycle of the original system clock. For example, if the fast emulation clock is 8 times faster than the system clock, 8 read/write operations may occur during one system clock cycle.

The bit-writes signal and the initial data in signal for the ASIC (e.g., the ASIC 100 of FIG. 1) are input into the modify data block 306 along with the data out signal from the FPGA 301. This data is then input into the FPGA 301 as data in.

The latch 308 receives data as data out from the FPGA 301 and the original system clock signal. The data out from the FPGA 301 is also input into the modify data block 306.

Figure 4:
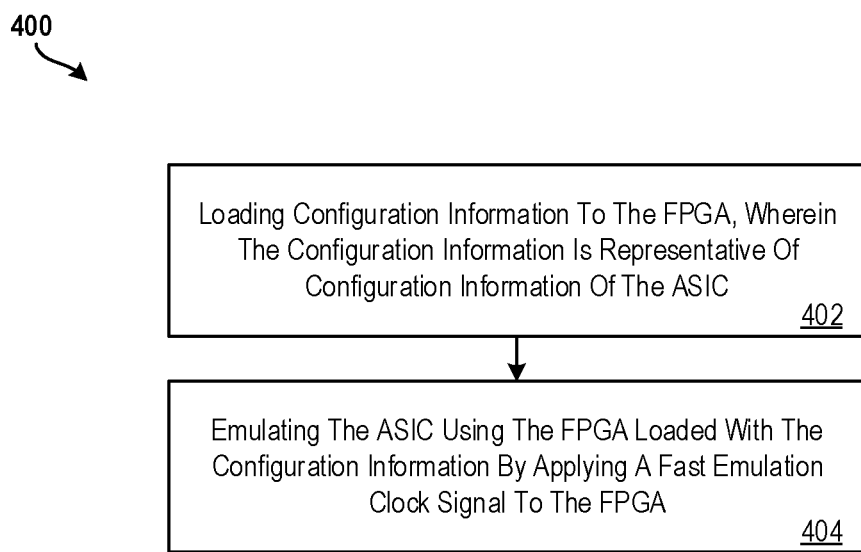
FIG. 4 illustrates a method for emulating an ASIC array using an FPGA emulator according to aspects of the present disclosure.

FIG. 4 illustrates a flow diagram of a method 400 for emulating an ASIC (e.g., the ASIC 100 of FIG. 1) array using an FPGA emulator according to examples of the present disclosure. The method 400 may be performed, for example, by the FPGA emulator 300 of FIG. 3, by the processing system 20 of FIG. 4, or by another suitable device.

At block 402, the method 400 includes loading configuration information to the FPGA (e.g., the FPGA 301 of FIG. 3). The configuration information is representative of configuration information of the ASIC. For example, the ASIC is programmed by a designer to perform a particular task. This programming is loaded to the FPGA as configuration information such that the FPGA is configured to perform the same particular task that the ASIC was programmed to perform.

At block 404, the method 400 includes emulating the ASIC using the FPGA loaded with the configuration information by applying a fast emulation clock signal to the FPGA. According to examples of the present disclosure, the fast emulation clock signal may be a multiple of a system clock signal. For example, the fast emulation clock signal may be 4, 8, 10, etc. times the system clock signal. In one example, if the system clock is 250 MHz, the fast emulation clock may be 2 GHz (i.e., an 8-times multiplier).

The FPGA may receive the fast emulation clock signal from a fast emulation clock (e.g., the fast emulation clock 302 of FIG. 3). The FPGA may also receive an address signal, a data in signal, and a read/write signal. According to aspects of the present disclosure, emulating the ASIC using the FPGA further includes applying the fast emulation clock signal to a read/write toggle block (e.g., the read/write toggle block 304 of FIG. 3) to toggle the read/write signal that is input into the FPGA. In yet additional aspects of the present disclosure, the data in signal is received from a modify data block, and the data in signal is based on a bit-writes signal, an initial data in signal, and an output of the FPGA. The system clock signal may be applied to a latch that receives an output of the FPGA, and the latch may output emulation data based on the emulation of the ASIC using the FPGA Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
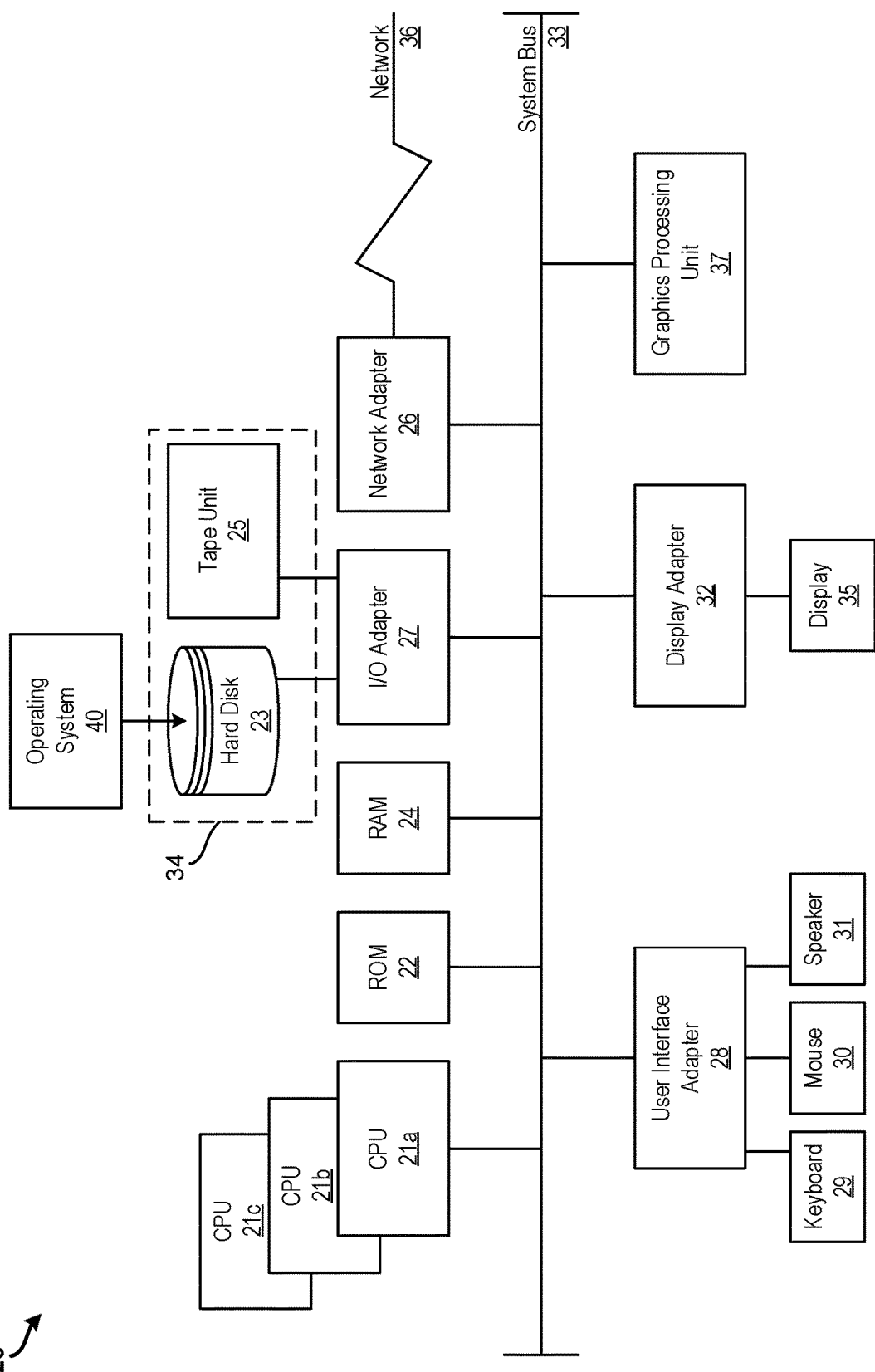
FIG. 5 illustrates a block diagram of a processing system for implementing the techniques described herein according to aspects of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for emulating an application-specific integrated circuit (ASIC) array using a field programmable gate array (FPGA), the method comprising:
   loading configuration information to the FPGA, wherein the configuration information is representative of configuration information of the ASIC; and
   emulating the ASIC using the FPGA loaded with the configuration information by applying a fast emulation clock signal to the FPGA instead of a system clock signal, wherein a frequency of a fast emulation clock is a multiple number of a frequency of a system clock, wherein emulating the ASIC comprises performing a number of read/write cycles during one system clock cycle, the number of read/write cycles being equal to the multiple number, wherein emulating the ASIC using the FPGA further comprises applying the fast emulation clock signal and a read/write signal to a read/write toggle block, the read/write toggle block providing a read/write signal input to the FPGA based on the timing of the fast emulation clock signal and the read/write signal to toggle the FPGA between a read operation and a write operation based on whether a read or write is occurring during a particular cycle associated with the fast emulation clock,
   wherein the FPGA receives an address signal, a data in signal, and the read/write signal,
   wherein the data in signal is received from a modify data block, wherein the data in signal is based on an initial data in signal and an output of the FPGA, and wherein the initial data in signal and the output of the FPGA are inputted into the modified data block.

2. The computer-implemented method of claim 1, wherein the FPGA receives the fast emulation clock signal from the fast emulation clock.

3. The computer-implemented method of claim 1, wherein the system clock signal is applied to a latch that receives the output of the FPGA.

4. The computer-implemented method of claim 3, wherein the latch outputs emulation data based on the emulation of the ASIC using the FPGA.

* * * * *